United States Patent [19]

Ishikawa et al.

[11] Patent Number: 4,989,196

[45] Date of Patent: Jan. 29, 1991

[54] OPTICAL INFORMATION RECORDING APPARATUS

[75] Inventors: Akihiro Ishikawa, Neyagawa; Haruo Isaka, Hirakata, both of Japan

[73] Assignee: Matsushita Electric Industrial Co., Ltd., Osaka, Japan

[21] Appl. No.: 277,194

[22] Filed: Nov. 29, 1988

[30] Foreign Application Priority Data

Dec. 1, 1987 [JP] Japan .............................. 62-305045
Feb. 9, 1988 [JP] Japan ................................ 63-27959

[51] Int. Cl.⁵ .............................................. G11B 7/00
[52] U.S. Cl. ........................................ 369/54; 369/59
[58] Field of Search .................... 369/54, 59, 124, 109

[56] References Cited

U.S. PATENT DOCUMENTS 4,380,015 4/1983 Ito et al. .
4,425,637 1/1984 Tanaka et al. .
4,558,441 12/1985 Yokota et al. .
4,631,713 12/1986 Romeas et al. .

FOREIGN PATENT DOCUMENTS 0087174 8/1983 European Pat. Off. .
0126682 11/1984 European Pat. Off. .
0213623 3/1987 European Pat. Off. .
0289004 11/1988 European Pat. Off. .
55-28537 10/1980 Japan .
62-222403 9/1987 Japan .

Primary Examiner—Donald McElheny, Jr.
Attorney, Agent, or Firm—Wenderoth, Lind & Ponack

[57] ABSTRACT

An optical information recording apparatus optically records digital information on a recording medium, for example, a disc, a tape and so on. The area of an optical spot cannot be made smaller than a minimum area determined by a numerical aperture of an objective lens and the wave length of a reproducing beam. Consequently, this causes a problem that the code of digital signals often fails to be discriminated in reproducing short pits and/or short pit-intervals which are recorded on the recording medium. The apparatus detects a phase difference between each edge of an input digital signal and each corresponding edge of a digital signal reproduced from the recording medium. The edges of a next input digital signal of the same code construction as that of the first input signal are corrected by a correction amount according to the above phase difference, and such operations are repeated whenever input digital signals are inputted. Consequently the apparatus can decrease errors of code discrimination to minimum and achieve high edge correction. Furthermore, since the input digital signal is delayed by a time interval between the recording by the recording head and the reproducing by the reproducing head, edge correction can be achieved with high precision.

4 Claims, 5 Drawing Sheets

OPTICAL INFORMATION RECORDING APPARATUS

BACKGROUND OF THE INVENTION

1. FIELD OF THE INVENTION

The present invention relates to an optical information recording apparatus for optically recording digital information on a recording medium, for example, an optical disc, a tape and so on.

2. PRIOR ART

Optical information recording apparatus for optically recording information on a recording medium, for example, a video disc and a compact disc is widely used in the information memory.

Informations are recorded by means of pits which are concaved on the surface of an optical disc in such a manner that the length and the width of the pits vary in accordance with the informations. Reproducing of information from the optical disc having pits recorded thereon is achieved by irradiating a laser beam onto the optical disc to form optical spots each converged by an objective lens and detecting the amount of reflection of the laser beam from the surface of the optical disc. When pits are not irradiated by a laser beam, the laser beam reflected from the optical disc returns to the objective lens without a loss, and is received to detect a photocurrent by photo detectors. However, when pits are irradiated by a laser beam, the laser beam reflected from the optical disc expands of diffraction at pits and light amount returning to the objective lens decreases. Consequently photocurrent decreases in comparison with the case that pits are not irradiated by the laser beam. The level of the recorded signals reproduced based on the photocurrent in compared with a threshold level so that digital codes are determined depending on the level of the recorded signal higher or lower than the threshold level. Thus the pits are detected by irradiating the laser beam onto the optical disc so that the recorded information on the optical disc can be reproduced.

The principle of recording/reproducing of optical information recording/reproducing apparatus is described in U.S. Pat. No. 4,558,441, in which a peak detector provided in a data recording/reproducing apparatus detects the peaks of an electrical signal and generates a pulse signal having pulses synchronous with the peaks of the electrical signal.

However, the area of optical spot can not be made smaller than a minimum area determined by a numerical aperture of the optical lens and the wave length of a reproducing beam. Consequently when the length of a pit is too short, a problem occurs that the photocurrent of the reproducing beam at the leading edge and the trailing edge of the pits does not level down sufficiently, so that the signal reproduced from the pits has a pit length information shorter than the actual length of the pit. Similarly when pit-interval is too short, the signal reproduced from the pit-interval has a pit length information shorter than the actual length of the pit-interval. This causes a problem of code discrimination failure in reproducing short pits and/or short pit-intervals. Generally, in the case where digital codes are determined by presence and absence of pits, a similar problem occurs, and whereby the information can not be recorded/reproduced on and from optical discs in high density.

SUMMARY OF THE INVENTION

It is an object of this invention to prevent errors of code discrimination which tends to occur upon reproducing the signal recorded on a recording medium is such a manner as of short pits and/or short pit-intervals.

It is another object of this invention to shorten a time interval between recording by a recording head and reproducing by a reproducing head so as to perform high edge correction.

In accordance with a first aspect of this invention, a laser beam is irradiated on a recording medium so as to record information by a recording head in the form of pits in accordance with a digital signal inputted to an optical information recording apparatus so that the signal recorded on the recording medium is reproduced by irradiating a laser beam on the recording medium by a reproducing head. Each edge of a digital signal reproduced by a reproducing head is compared by a phase difference detection means with each corresponding edge of a digital signal inputted to the optical information recording apparatus. Then in accordance with a code construction immediately preceding the edge of the digital signal outputted from a edge detection means and with a code construction following the same edge, a correction amount is generated by a correction amount generating means based on the phase difference detected by a phase difference detection means, and the correction amount is added to a correction amount having been written in a memory means. This sum amount by the addition is then written refreshly in the memory means. The word "refreshly" or "refresh" here means that the correction amount preliminarily written in the memory means is replaced by the new sum of the correction amount consisting of the preliminarily written correction amount and the additional correction amount. Digital signals inputted to the optical information recording apparatus following the above digital signals are processed in a manner the same as the above manner so as to repeat a series of amount refresh operations whenever digital signals are inputted to the optical information recording apparatus.

Thus, in accordance with the teachings of the first aspect of this invention, the edge movement of the signal reproduced from the recording medium can be corrected, and errors of code discrimination can be suppressed to a minimum upon reproducing the signal recorded on the recording medium in a high density.

In accordance with the second aspect of this invention, a laser beam is irradiated on the recording medium so as to record information by a recording head in accordance with a digital signal inputted to the optical information recording apparatus so that the signal recorded on the recording medium is reproduced by irradiating a laser beam by a reproducing head on the recording medium. Each edge of the digital signal reproduced by the reproducing head is compared by a difference detection means with each corresponding edge of a digital signal delayed by a delay means which signal is inputted to the optical information recording apparatus. Then in accordance with a code construction immediately preceding the edge of the digital signal outputted from the edge detection means and with a code construction immediately following the same edge, a correction amount is generated by a correction amount generating means based on the phase difference detected by the phase difference detection means, and the correction amount is added to a correction amount having been written in a memory means. This sum amount by the addition is written refreshly in the memory means. The digital signals inputted to the optical information recording apparatus is delayed by the above delay means by a time interval between the recording by the recording head and the reproducing by the reproducing head. Following amount refresh operations of this second aspect of this invention is the same as that of the first aspect of the invention.

Thus, in accordance with the teachings of the second aspect of this invention, a time interval between the recording by the recording head and the reproducing by the reproducing head can be compensated so as to perform high edge correction.

DESCRIPTION OF THE PREFERRED EMBODIMENTS

A first aspect of this invention will first be described.

Figure 1:
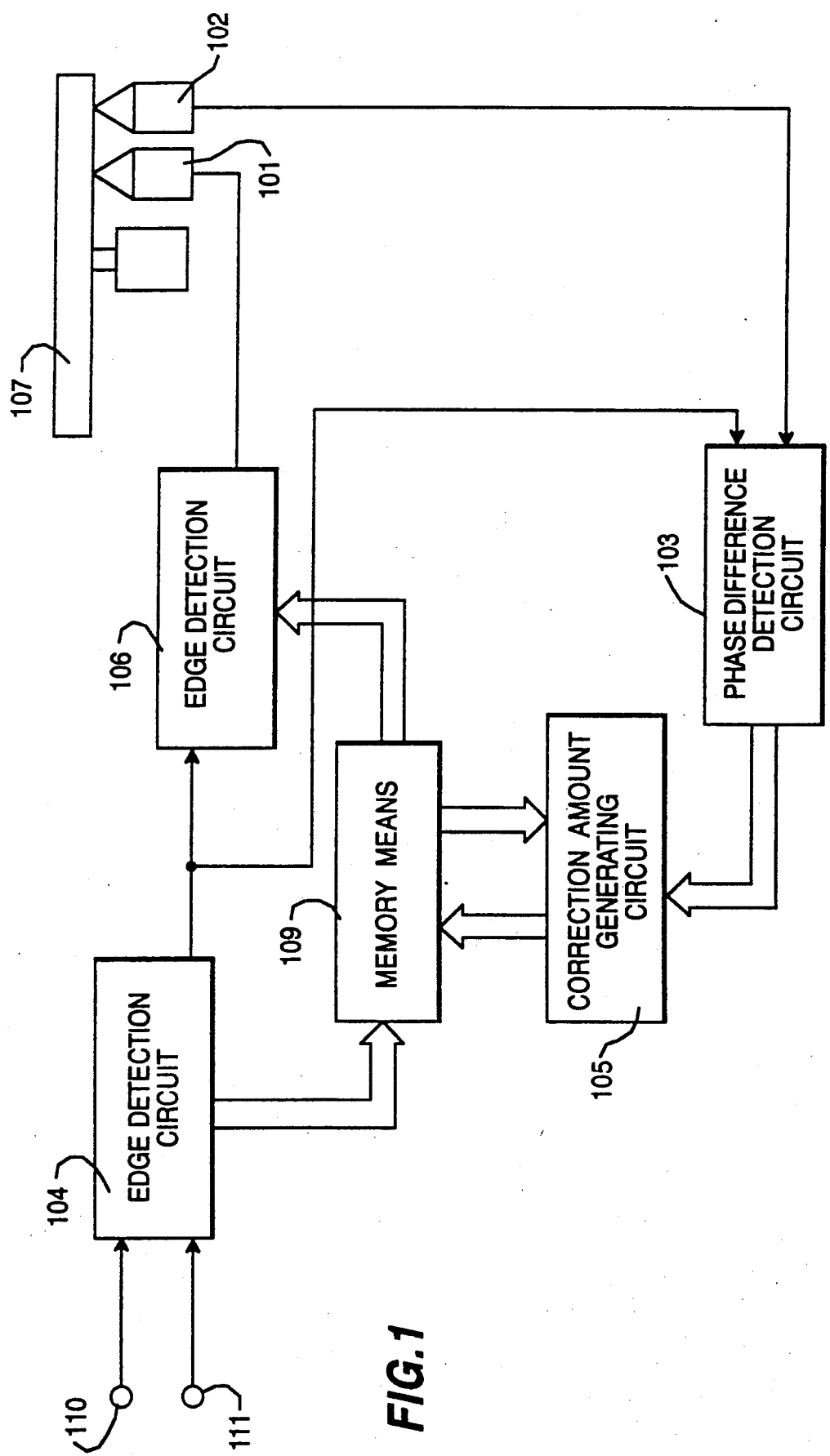
FIG. 1 is a schematic block diagram illustrating an example of an optical information recording apparatus according to a first aspect of this invention.

FIG. 1 is a schematic block diagram illustrating an example of an optical information recording apparatus according to a first aspect of this invention. An input digital signal to an optical information recording apparatus is inputted from an input terminal 110. Synchronizing clocks synchronized with the input digital signal are inputted from an input terminal 111. When a digital signal inputted to a recording head 101 is, for example, eight to fourteen modulation signal, the range (the lower limit and the upper limit) of a running length of each code of input digital signals is prescribed, and pits according to digital signals within the prescribed range of the running length of each code are recorded on an optical disc 107.

First of all, an initial amount is preliminarily written in a memory means 109 in such a manner that initially a correction amount for correcting edge positions of the digital signals is zero as to any running length of each code immediately preceding or following each rising edge or each falling edge of the digital signals. The digital signals inputted to the optical information recording apparatus is outputted to the recording head 101 through an edge correction circuit 106 without being corrected. Pits are recorded on the optical disc 107 by the recording head 101 in accordance with digital signals from the edge correction circuit 106, and a reproducing head 102 irradiates a laser beam on the optical disc 107 and reproduces digital signals based on pits recorded on the optical disc 107. The recording head 101 irradiate a laser beam on the optical disc 107 so as to record pits when, for example, digital signals have a low level. The reproducing head 102 irradiates a laser beam on the optical disc 107 so as to receive the beam reflected by photo detectors (not shown) and deliver digital signals. The phase difference between each edge of the digital signals outputted from the reproducing head 102 and each corresponding edge of the digital signals outputted to the optical information recording apparatus is detected by a phase difference detection circuit 103. At this time a correction amount for each edge is generated by a correction amount generating circuit 105 based on the phase difference outputted from the phase difference detection circuit 103 in accordance with the running length, immediately preceding and immediately following the edge, of each code of digital signals inputted through a edge detection circuit 104. The correction amount is added to a correction amount having been written in the memory means 109, and this sum amount by the addition is refreshly written in the memory means 109.

Figure 2:
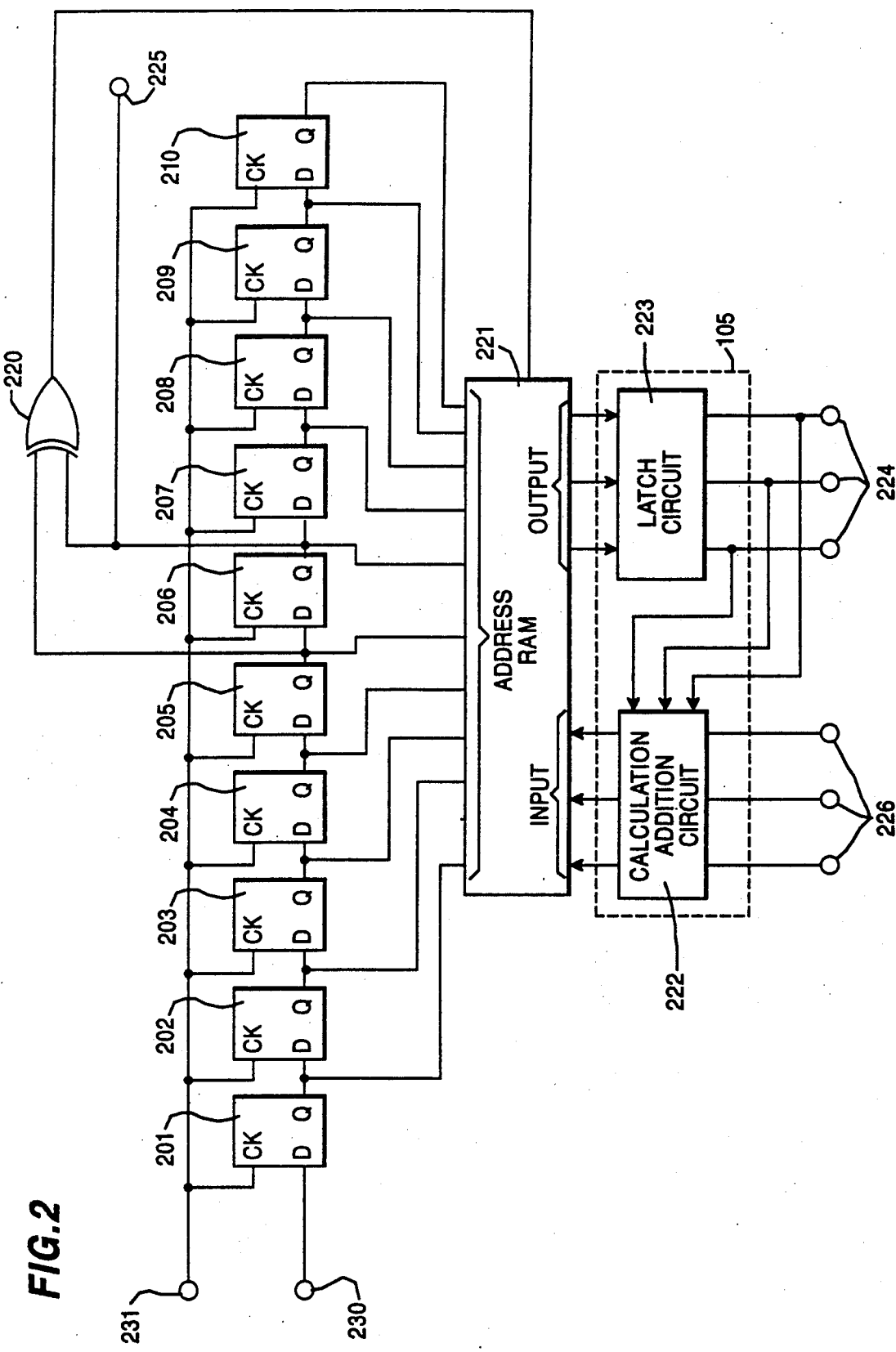
FIG. 2 is a schematic diagram, partially in block form, illustrating an example of an edge detection circuit, a correction amount generating circuit and a memory means in FIG. 1.

FIG. 2 is a schematic diagram, partially in block form, illustrating an example on an edge detection circuit, a correction amount generating circuit, and a memory means shown in FIG. 1. The correction amount generating circuit 105 shown in FIG. 1 comprises a calculation addition circuit 222 and a latch circuit 223, and the memory means 109 shown in FIG. 1 comprises RAM 221. The edge detection circuit 104 comprises shift registers 201 to 210 that latch, in synchronization with synchronizing clocks inputted from an input terminal 231 synchronized with the digital signal, an digital signal inputted from an input terminal 230, and also comprises an exclusive OR gate 220 between the output from a shift register 205 and the output from a shift register 206. The output signal from the phase difference detection circuit 103 is inputted to an input terminal 226, and the calculation addition circuit 222 calculates a correction amount based on the output signal from the phase difference detection circuit 103. When the output signal from the exclusive OR gate 220 turns to have a high level, a correction amount obtained by latching correction amount data written in RAM 221 by a latch circuit 223 is added to the correction amount calculated by the calculation addition circuit 222. Consequently this sum amount by the addition is written in RAM 221 refreshly. Necessary number of series-connected steps of shift registers can be determined in accordance with a range of the influence in which range an optical spot has an influence on pits.

Digital signals inputted to the optical information recording apparatus following the above described digital signals are processed in a manner the same as the above manner so as to repeat a series of amount refresh operations whenever digital signals are inputted to the optical information recording apparatus. Consequently a correction amount calculated based on the phase difference detected by the phase difference detection circuit 103 is added to a correction amount having been written in the memory means 109, and this sum amount by the addition is written refreshly in the memory means 109. This sum amount by the addition gradually approaches a real amount to be corrected. In accordance with the correction amount, the edge of digital signal inputted to the optical information recording apparatus is connected with the edge correction circuit 106, and pits are recorded on the optical disc 107 by irradiating a laser beam on the optical disc 107.

Figure 3:
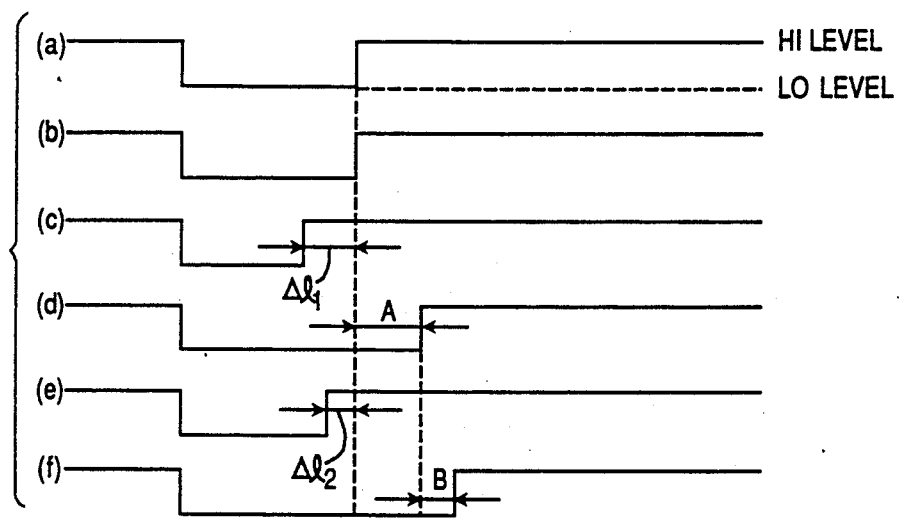
FIG. 3(a)-(f), is a schematic waveform chart illustrating waveforms of a recorded signal and a reproduced signal on and from a recording medium according to an example of the apparatus of this invention.

The operation of the above example of this invention will now be described with reference to FIG. 3. FIG. 3 illustrates, at sections (a), (b), (c), (d), (e) and (f), waveforms of the recorded signal and the reproduced signal on and from the optical disc according to this invention, this illustrates waveforms of the case of forming a short pit between long pit-intervals. The low level corresponds to a pit and the high level corresponds to a pit-interval.

First, the digital signal waveform as shown at section (b) in FIG. 3 is recorded on the optical disc based on the digital signal waveform as shown at section (a) that is inputted to this optical information recording apparatus. However, the low level time of the waveform reproduced from the optical disc 107, as shown at section (c), is shorter than the low level time of the digital signal waveform at (a) by $\Delta l_1$. When a digital signal having the same code construction with waveform at (a) is inputted to this optical information recording apparatus, and its edge is detected again by means of the edge detection circuit 104, the digital signal waveform as shown at section (d) in FIG. 3 having been corrected by amount A as shown at section (d) in FIG. 3 is recorded on the optical disc 107 based on the phase difference between the edge of the waveform at (c) and the edge of the digital signal waveform at (a). This amount A at (d) in FIG. 3 is an amount having been written as a correction amount in RAM 221 as shown in FIG. 2. When the recording signal waveform at (d) in FIG. 3 recorded on the optical disc 107 is reproduced, the reproduced signal may still have a phase difference by $\Delta l_2$ as shown at (e) in FIG. 3.

Afterwards, when a digital signal having the same code construction as that of the waveform at (a) is inputted to this optical information recording apparatus, and its edge is detected by means of the edge detection circuit 104, the edge of the digital signal waveform shown at section (a) in FIG. 3 inputted to this optical information recording apparatus is compared with the edge of digital signal waveform shown at section (e) in FIG. 3, and a correction amount B shown in FIG. 3 is calculated. Consequently the digital signal as shown at section (f) in FIG. 3 corrected by amount A plus B is recorded on the optical disc 107. This amount A plus B of (f) in FIG. 3 is an amount having been written as a correction amount in RAM 221 shown in FIG. 2. Thus a series of operations is repeated whenever digital signal is inputted to this operation recording apparatus. Consequently a corrected edge of digital signal approaches without limit to the edge of the digital signal inputted to this optical information recording apparatus.

Figure 4:
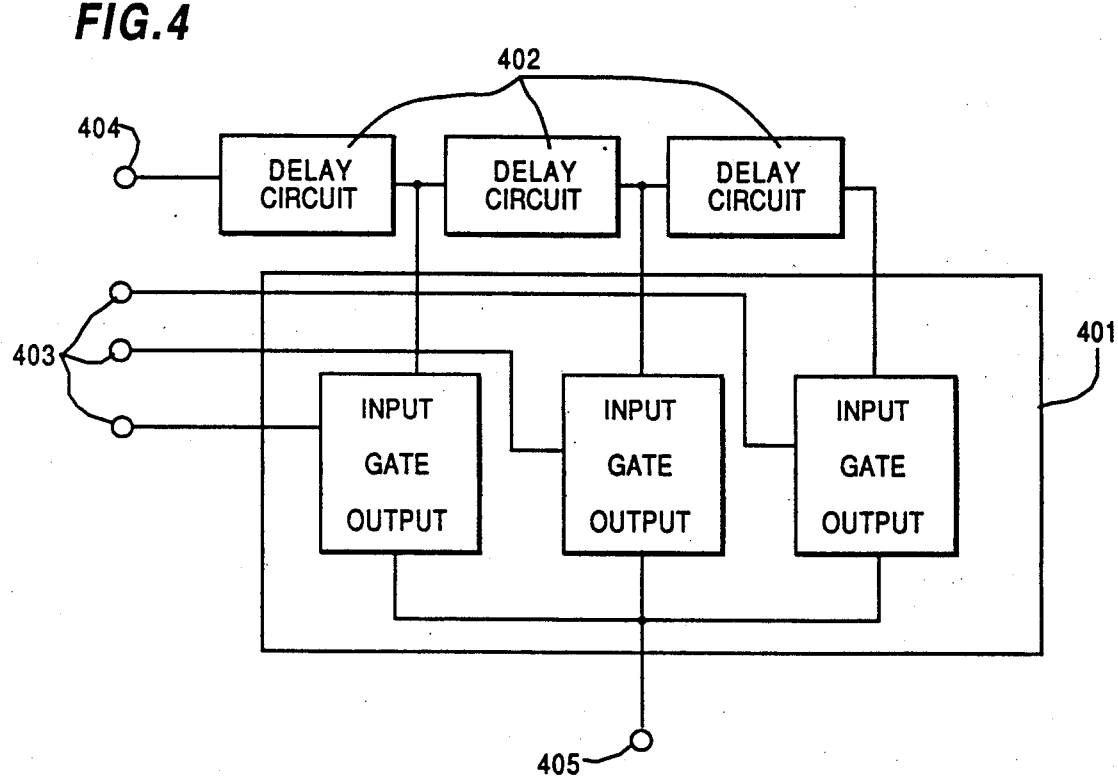
FIG. 4 is a schematic block diagram illustrating an edge correction circuit according to an example of the apparatus of this invention.

FIG. 4 illustrates an example of an edge correction circuit usable in the apparatus of this invention. A select terminal 403 of multiplexer 401 shown in FIG. 4 is connected with an output terminal 224 of a latch circuit 223 shown in FIG. 2 which latches correction amount data written in RAM 221 shown in FIG. 2. In accordance with the output from the latch circuit 223, gates shown in FIG. 4 are changed so that delay time can be varied by delay circuits 402 as shown in FIG. 4. Pits are recorded on the optical disc 107 by means of the recording head 101 shown in FIG. 1 in accordance with the corrected digital signal outputted from an output terminal 405 of multiplexer 401.

The correction amount to be applied to the input digital signal is to be determined already when the edge of the input digital signal to be corrected reaches the edge correction stage. For conveniently achieving this purpose, an output terminal 225 of the digital signal in FIG. 2 is designed to be connected to the output terminal of the shift register 206, and be connected to the input terminal 404 of multiplexer 401 shown in FIG. 4, because the exclusive OR gate 220 detects the edge of the input digital signal by logically processing the output signals of the shift registers 205 and 206 thereby to determine the edge timing of the input digital signal to be corrected.

For achieving the above purpose, however, it is not always necessary to connect the output terminal 225 to the output terminal of the shift register 206. The output terminal 225 can be connected to the output terminal of the shift register 205 or even to the input terminal of the shift register 201, if the correction amount to be applied to the input digital signal can be already determined, by e.g. delaying the signal fed to the output terminal 225, when the edge of the input digital signal reaches the edge correction stage.

As described above, according to the first aspect of this invention, since pits are recorded on the optical disc in accordance with a code construction of a corrected digital signal, and such operation is repeated, so errors of code discrimination which tends to occur when reproducing short pits and/or short pit-intervals recorded on the optical disc can be suppressed to a minimum and reliability of apparatus can be increased.

A second aspect of this invention will now be described.

While in the first aspect of this invention each edge of a digital signal inputted to an optical information recording apparatus is compared, as to phase, with each corresponding edge of a digital signal reproduced from an optical disc, according to this second aspect of this invention, each edge of the digital signal obtained by delaying, by a delay circuit, the digital signal inputted to this optical information recording apparatus is compared, as to phase, with each edge of the digital signal reproduced from the optical disc so as to achieve high edge correction.

Figure 5:
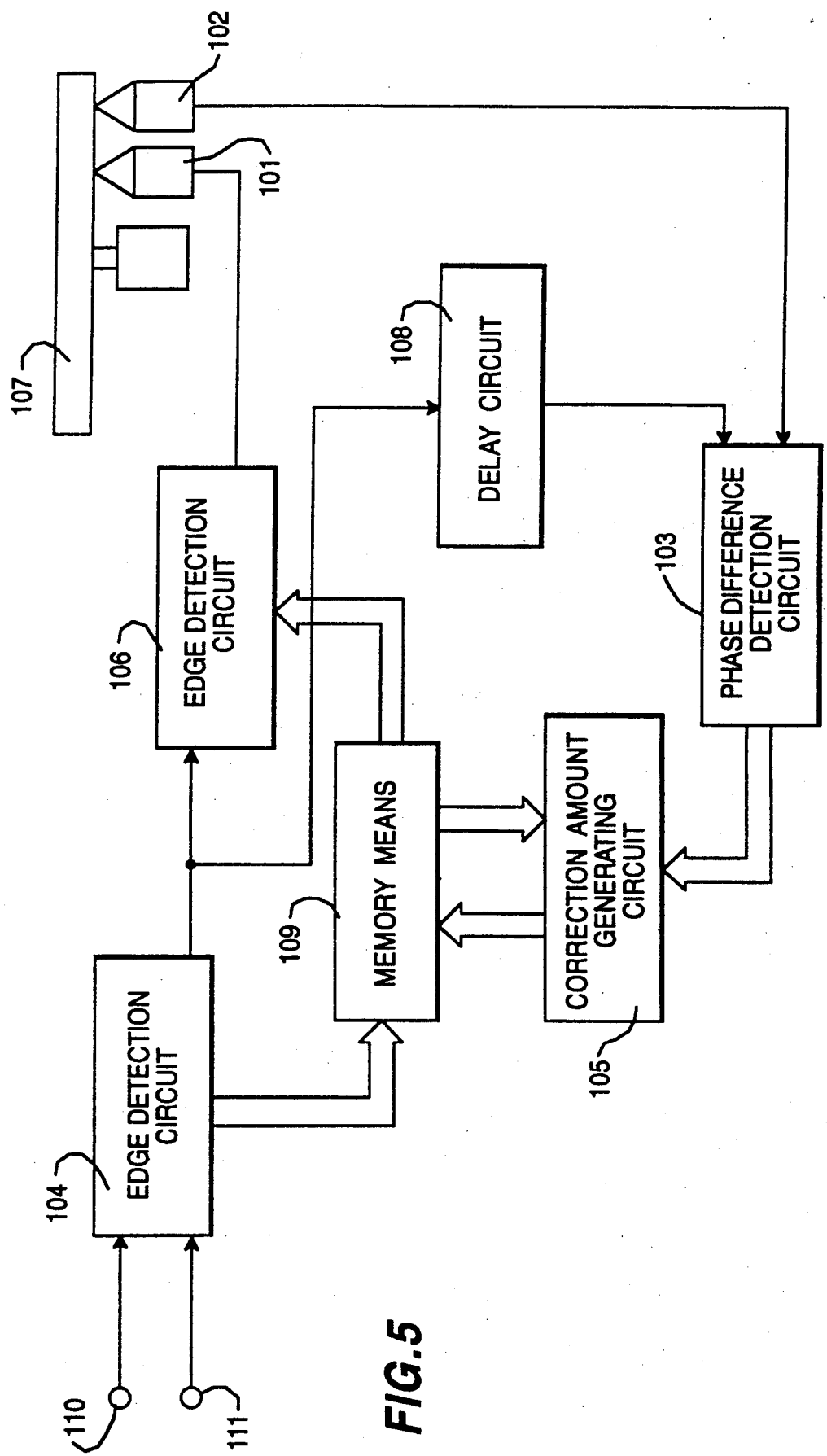
FIG. 5 is a schematic block diagram illustrating an example of an information recording apparatus according to a second aspect of this invention.

An example of an optical information recording apparatus according to the second aspect is schematically illustrated in FIG. 5. In FIG. 5, components 101 to 107 and 109 to 111 are identical to the corresponding components in FIG. 1, and reference numeral 108 designates a delay circuit.

After signals are recorded by a recording head 101 on the optical disc 107 in FIG. 5, the signals are reproduced by a reproducing head 102 from the optical disc 107 in FIG. 5. Thereby, time interval occurs between the digital signals recorded on the optical disc 107 and the digital signals reproduced from the optical disc 107 due to the position difference between the two heads. To cancel the time interval, the optical information recording apparatus according to this example of this invention delays an inputted digital signal by a delay circuit 108 shown in FIG. 5 so as to input the delayed signal to a phase difference detection circuit 103 shown in FIG. 5.

Figure 6:
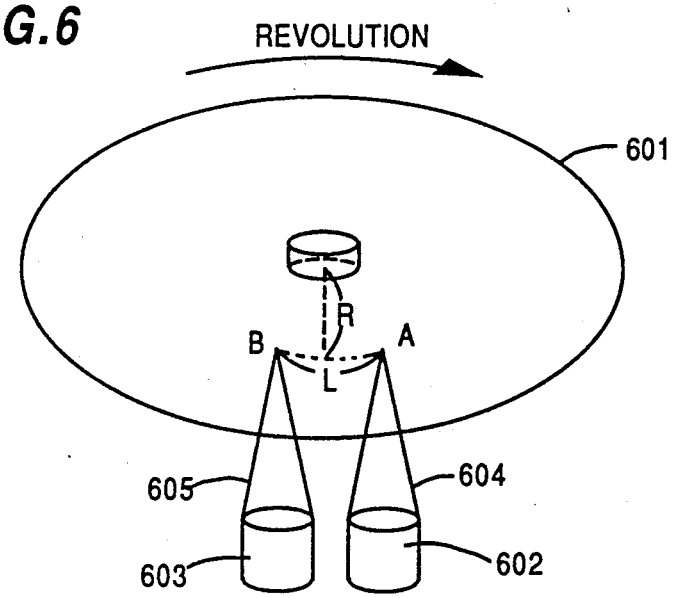
FIG. 6 is a schematic perspective view illustrating one part of an example of optical information recording apparatus according to the second aspect of this invention.

One part of the optical information recording apparatus according to an example of the second aspect of this invention is schematically illustrated in FIG. 6. As shown in FIG. 6, assuming that the point on the optical disc 601 to which point a recording beam 604 is irradiated by a recording head 602 is A, the point on the optical disc 601 to which point a reproducing beam 605 is irradiated by a reproducing head 603 is B, the distance between point A and point B is L, the radius position at which the information is recorded and reproduced on and from the optical disc 601 is R, the linear velocity is V, the angular velocity is W, then the time interval namely delay time T in the case of a constant linear velocity disc is expressed by the following equation (1):

$$T = L/V \qquad \qquad \text{......(1)}$$

In the case of constant angular velocity discs, delay time T is expressed by the following equation (2):

$$T = L/R \qquad \qquad \text{......(2)}$$

Therefore, in the case of constant linear velocity discs, since linear velocity is constant and the distance L between point A and point B is also constant, delay time T becomes constant. If the delay circuit 108 has delay time T determined by the equation (1), the time interval between the recording signal on the optical disc 107 by the recording head 101 and the reproducing signal from the optical disc 107 by the reproducing head 102 is cancelled so that correction amount of high precision is recorded in RAM 221 shown in FIG. 2.

Figure 7:
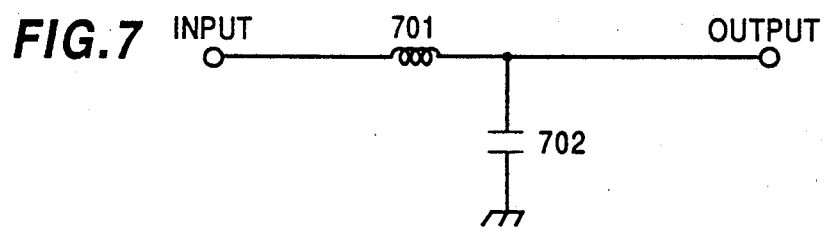
FIG. 7 is a circuit diagram illustrating an example of a delay circuit usable in an apparatus according to the second aspect of this invention in which a constant linear velocity disc is used as a recording medium.

An example of a delay circuit usable in the second aspect of this invention in which a constant linear velocity disc is used as the optical disc 107 is illustrated schematically in FIG. 7. Inductance 701 and capacitor 702 shown in FIG. 7 may be selected to thereby determine a delay time equal to the delay time T determined by the equation (1).

In the case of constant angular velocity discs, since angular velocity is constant and the distance L between point A and point B shown in FIG. 6 is also constant, delay time T decreases in inverse proportion to the radius position R at which an information is recorded and reproduced on and from the optical disc 601. If delay circuit 108 has a variable delay time determined by the equation (2) in accordance with the recording and reproducing position on and from the optical disc 601, then the above time interval is cancelled so that correction amount of high precision is recorded on RAM 221 shown in FIG. 2 in the same way as the case of the above constant linear velocity disc.

Figure 8:
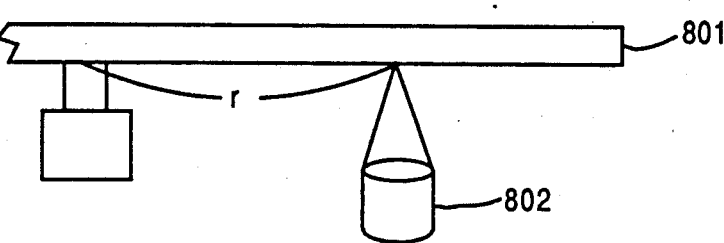
FIG. 8 is a schematic diagram, partially in block form, illustrating an example of a delay circuit usable in an example of the second aspect of this invention in which a constant angular velocity disc is used as a recording medium.

FIG. 8 is a diagram illustrating an example of a delay circuit usable in the second aspect of this invention in which a constant angular velocity disc is used as an optical disc. It is assumed that the radius position on the optical disc 801 at which an information is recorded by means of a recording head 802 is r. The radius position is detected using digital signals of the addresses of recording signals on the optical disc 801 and using the r, the reciprocal of r is calculated by means of an arithmetic circuit 803 shown in FIG. 8. The amount corresponding to the delay time T changing in accordance with the reciprocal of r is preliminarily written in ROM 805. Using the reciprocal of r calculated by means of the arithmetic circuit 803, the amount corresponding to the reciprocal of r is read from ROM 805 by microcomputer 804, and in accordance with this amount, the delay time of delay circuit 806 is changed. In this manner, the digital signal inputted from an input terminal is delayed by delay time T determined and varied according to the equation (2). Therefore, the delay time between the signal recorded on the optical disc 107 by means of the recording head 101 shown in FIG. 5 and the signal reproduced from the optical disc 107 by means of the reproducing head 102 shown in FIG. 5 is cancelled so that correction amount of high precision is written in RAM 221 shown in FIG. 2 in the same way as the case of above constant linear velocity disc.

In the case that an optical disc is a constant angular velocity disc, it is obvious that the radius position r can be detected by using the reproducing head 603 shown in FIG. 6. Though the delay circuit according to this example is a concentrated constant delay circuit, it may comprise of analog delay lines. Furthermore, in this example according to this invention, the edge correction is achieved by delaying the edge of the digital signal. However the edge correction may also be achieved by modulating the intensity of a laser beam. The output signal from the edge detection circuit is needed to delay by a time interval between the recording by the recording head and the reproducing by the reproducing head. The digital signal inputted to the edge correction circuit need be delayed by such time that requires the processing in the edge detection circuit, the correction amount generating circuit, and the memory means.

The preferred examples described above use an optical disc as a recording medium. However, according to this invention an optical disc may be replaced by an optical tape, an optical card and so on.

As described above, according to this example, since the digital signal inputted to an optical information recording apparatus is inputted to a phase difference detection circuit through a delay circuit, and since the digital signal is delayed by such time interval between the recording by the recording head and the reproducing by the reproducing head, edge correction of high precision can be achieved.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An optical information recording apparatus comprising:
    edge detection means operatively coupled to an input terminal of the apparatus for detecting a leading or a trailing edge of an input digital signal so as to output first digital signals;
    edge correction means operatively coupled to said input terminal for correcting an edge of an input digital signal;
    a recording head operatively coupled to said edge correction means for recording, on a recording medium by irradiating an optical beam, information corresponding to a corrected digital signal outputted from said edge correction means;
    a reproducing head for reproducing, from said recording medium by irradiating an optical beam, a second digital signal corresponding to said informations having been recorded on said recording medium;

phase difference detection means operatively coupled to said reproducing head and said input terminal for detecting a phase difference between an edge of an input digital signal and a corresponding edge of said second digital signal;

memory means operatively coupled to said edge detection circuit for memorizing correction amounts at addresses thereof designated by said first digital signal; and correction amount generating means operatively coupled to said phase difference detection means and said memory means for generating correction amounts based on signals detected by said phase difference detection means and the correction amounts preliminarily memorized in said memory means, wherein the correction amounts generated by said correction amount generating means are refreshly memorized in said memory means in place of said correction amounts preliminarily memorized in said memory means, and are also fed to said edge correction means, whereby said edge correction means achieves the edge correction operation in accordance with the correction amounts generated by said correction amount generating means and fed thereto.

2. An optical informtion recording apparatus according to claim 1, which further comprises a delay means operatively coupled between said input terminal and said phase difference detection means for delaying an input digital signal by a delay time between the recording by said recording head and the reproducing by said reproducing head.

3. An optical information recording apparatus according to claim 2, wherein said delay time is determined by selecting inductances and capacitors of said delay means in the case of using a constant linear velocity disc as said recording medium.

4. An optical information recording apparatus according to claim 2, wherein said delay time is varied in accordance with a radius position on the recording medium at which an information is recorded by a recording head in the case of using a constant angular velocity disc as said recording medium.

* * * * *